United States Patent
Zaitsev et al.

(10) Patent No.: US 12,164,676 B2
(45) Date of Patent: Dec. 10, 2024

(54) ENABLING AN ACTION BASED ON A PERMISSION IDENTIFIER FOR REAL-TIME IDENTITY RESOLUTION IN A DISTRIBUTED SYSTEM

(71) Applicant: Ridgeline, Inc., Incline Village, NV (US)

(72) Inventors: Timophey Zaitsev, Incline Village, NV (US); Matthew Sewall, Incline Village, NV (US); Sabina Sobhani, New York, NY (US)

(73) Assignee: Ridgeline, Inc., Incline Village, NV (US)

( * ) Notice: Subject to any disclaimer, the term of this patent is extended or adjusted under 35 U.S.C. 154(b) by 205 days.

(21) Appl. No.: 17/900,384

(22) Filed: Aug. 31, 2022

(65) Prior Publication Data

US 2023/0086068 A1  Mar. 23, 2023

Related U.S. Application Data

(60) Provisional application No. 63/247,148, filed on Sep. 22, 2021.

(51) Int. Cl.
| | |
|---|---|
| *G06F 21/62* | (2013.01) |
| *G06F 21/53* | (2013.01) |
| *H04L 67/10* | (2022.01) |

(52) U.S. Cl.
CPC ............ *G06F 21/629* (2013.01); *G06F 21/53* (2013.01); *G06F 21/6218* (2013.01); *H04L 67/10* (2013.01); *G06F 2221/034* (2013.01)

(58) Field of Classification Search
CPC .... G06F 21/629; G06F 21/53; G06F 21/6218; G06F 2221/034; G06F 21/31; H04L 67/10; H04L 67/133
See application file for complete search history.

(56) References Cited

U.S. PATENT DOCUMENTS

| | | |
|---|---|---|
| 9,716,617 B1 | 7/2017 | Ahuja |
| 9,983,860 B1 | 5/2018 | Koty |
| | (Continued) | |

FOREIGN PATENT DOCUMENTS

| | | |
|---|---|---|
| CN | 110086822 | 7/2021 |

OTHER PUBLICATIONS

Rana, "Manage customer record unified way", SlideShare, May 28, 2020, retrieved on [Sep. 12, 2022]. Retrieved from the internet <URL: https://www.slideshare.net/rase1cse10/manage-customer-record-unified-way>.

(Continued)

*Primary Examiner* — El Hadji M Sall
(74) *Attorney, Agent, or Firm* — Van Pelt, Yi & James LLP

(57) ABSTRACT

The present application discloses a method, system, and computer system for authentication permissions with respect to an action. The method includes receiving, by a microservice comprised in a distributed computing environment, a permissions identifier comprising an indication of the set of permissions permitted for a requesting entity, receiving, by the microservice, a request to perform one or more actions on behalf of the requesting entity, determining whether the permissions identifier enables performing the one or more actions on behalf of the requesting entity, in response to determining that the permissions identifier enables performing the one or more actions on behalf of the requesting entity, performing the one or more actions, and providing to the requesting entity one or more results for the one or more actions.

20 Claims, 8 Drawing Sheets

(56) References Cited

U.S. PATENT DOCUMENTS

| | | |
|---|---|---|
| 10,013,550 B1 | 7/2018 | Ahuja |
| 10,142,356 B2 | 11/2018 | Ahuja |
| 10,212,041 B1 | 2/2019 | Rastogi |
| 10,313,362 B2 | 6/2019 | Ahuja |
| 10,362,097 B1 | 7/2019 | Gupta |
| 10,382,266 B1 | 8/2019 | Balakrishnan |
| 10,417,043 B1 | 9/2019 | Braverman |
| 10,425,350 B1 | 9/2019 | Florissi |
| 10,516,672 B2 | 12/2019 | Gupta |
| 10,601,856 B1 | 3/2020 | Natanzon |
| 10,637,952 B1 | 4/2020 | Koenig |
| 10,664,317 B2 | 5/2020 | Han |
| 10,680,918 B1 | 6/2020 | Mazzitelli |
| 10,685,115 B1 | 6/2020 | Lieberman |
| 10,686,908 B2 | 6/2020 | Du |
| 10,764,244 B1 | 9/2020 | Mestery |
| 10,778,751 B2 | 9/2020 | Cheng |
| 10,791,063 B1 | 9/2020 | Florissi |
| 10,827,020 B1 | 11/2020 | Cao |
| 10,892,960 B1 | 1/2021 | Emelyanov |
| 10,893,100 B2 | 1/2021 | Jamjoom |
| 10,924,334 B1 | 2/2021 | Kumar |
| 10,979,516 B1 | 4/2021 | Giannetti |
| 11,064,055 B2 | 7/2021 | Wegener |
| 11,074,091 B1 | 7/2021 | Nayakbomman |
| 11,151,283 B2 | 10/2021 | Schwed |
| 11,153,227 B1 | 10/2021 | Chamberlain |
| 11,153,325 B1 | 10/2021 | Igolnik |
| 11,153,412 B1 | 10/2021 | Varadan |
| 11,397,919 B1 | 7/2022 | Thiagrajan |
| 11,456,911 B1 | 9/2022 | Krishnagi |
| 11,579,915 B2 | 2/2023 | To |
| 11,632,360 B1 | 4/2023 | Tan |
| 11,928,491 B1 | 3/2024 | Zhang |
| 2010/0299437 A1 | 11/2010 | Moore |
| 2016/0127454 A1 | 5/2016 | Maheshwari |
| 2017/0063833 A1 | 3/2017 | Colle |
| 2017/0098162 A1 | 4/2017 | Ellenbogen |
| 2017/0230349 A1 | 8/2017 | Gaur |
| 2017/0242784 A1 | 8/2017 | Heorhiadi |
| 2017/0244593 A1 | 8/2017 | Rangasamy |
| 2017/0329957 A1 | 11/2017 | Vepa |
| 2017/0331812 A1 | 11/2017 | Lander |
| 2017/0331829 A1 | 11/2017 | Lander |
| 2017/0373945 A1 | 12/2017 | Chrysanthakopoulos |
| 2018/0067903 A1 | 3/2018 | Maker |
| 2018/0075231 A1 | 3/2018 | Subramanian |
| 2018/0075527 A1 | 3/2018 | Nagla |
| 2018/0083835 A1 | 3/2018 | Cole |
| 2018/0084063 A1 | 3/2018 | Miedema |
| 2018/0115514 A1 | 4/2018 | Chou |
| 2018/0115525 A1 | 4/2018 | Chou |
| 2018/0115586 A1 | 4/2018 | Chou |
| 2018/0115635 A1 | 4/2018 | Ahuja |
| 2018/0131764 A1 | 5/2018 | Suter |
| 2018/0136959 A1 | 5/2018 | Vyas |
| 2018/0139305 A1 | 5/2018 | Thibeault |
| 2018/0144823 A1 | 5/2018 | Raman |
| 2018/0198845 A1 | 7/2018 | Kulp et al. |
| 2018/0211202 A1 | 7/2018 | Ynion, Jr. |
| 2018/0248772 A1 | 8/2018 | Orsini |
| 2018/0262391 A1 | 9/2018 | Jung |
| 2018/0270125 A1 | 9/2018 | Jain |
| 2018/0285250 A1 | 10/2018 | Helsley |
| 2018/0307524 A1 | 10/2018 | Vyas |
| 2018/0309630 A1 | 10/2018 | Zhao |
| 2018/0309637 A1 | 10/2018 | Gill |
| 2018/0331905 A1 | 11/2018 | Toledo |
| 2018/0359336 A1 | 12/2018 | Chattopadhyay |
| 2018/0375950 A1 | 12/2018 | Walker |
| 2019/0045008 A1 | 2/2019 | Murthy |
| 2019/0045037 A1 | 2/2019 | Sukhomlinov |
| 2019/0058761 A1 | 2/2019 | Hassan |
| 2019/0089809 A1 | 3/2019 | Theebaprakasam |
| 2019/0098055 A1 | 3/2019 | Pitre |
| 2019/0098056 A1 | 3/2019 | Pitre |
| 2019/0098080 A1 | 3/2019 | Bermudez |
| 2019/0102157 A1 | 4/2019 | Caldato |
| 2019/0102162 A1 | 4/2019 | Pitre |
| 2019/0102567 A1 | 4/2019 | Lemay |
| 2019/0104184 A1 | 4/2019 | Gao |
| 2019/0132320 A1 | 5/2019 | Burckhardt |
| 2019/0149592 A1 | 5/2019 | Lander |
| 2019/0179663 A1 | 6/2019 | Xu |
| 2019/0208007 A1 | 7/2019 | Khalid |
| 2019/0213346 A1 | 7/2019 | Friedman |
| 2019/0294449 A1 | 9/2019 | Leon |
| 2019/0312792 A1 | 10/2019 | Srinivasan |
| 2019/0320030 A1 | 10/2019 | Walsh |
| 2019/0340059 A1 | 11/2019 | Bagarolo |
| 2019/0373083 A1 | 12/2019 | Nucci |
| 2020/0004847 A1 | 1/2020 | Bagga |
| 2020/0007530 A1 | 1/2020 | Mohamad Abdul |
| 2020/0021505 A1 | 1/2020 | Nithya |
| 2020/0043008 A1 | 2/2020 | Hrabik |
| 2020/0045117 A1 | 2/2020 | Ross |
| 2020/0050494 A1 | 2/2020 | Bartfai-Walcott |
| 2020/0057863 A1 | 2/2020 | Seewald |
| 2020/0065086 A1 | 2/2020 | Woodmansee |
| 2020/0089533 A1 | 3/2020 | Guha |
| 2020/0106857 A1 | 4/2020 | Rezek |
| 2020/0112497 A1 | 4/2020 | Yenumulapalli |
| 2020/0120000 A1 | 4/2020 | Parthasarathy |
| 2020/0120168 A1 | 4/2020 | Nainar |
| 2020/0127980 A1 | 4/2020 | Smith |
| 2020/0133689 A1 | 4/2020 | Ferrell |
| 2020/0133738 A1 | 4/2020 | Junior |
| 2020/0133795 A1 | 4/2020 | Rhodes |
| 2020/0151023 A1 | 5/2020 | Bai |
| 2020/0153699 A1 | 5/2020 | Bai |
| 2020/0162578 A1 | 5/2020 | Appajanna |
| 2020/0167215 A1 | 5/2020 | Sidhu |
| 2020/0186571 A1* | 6/2020 | Lynk ................ H04L 63/20 |
| 2020/0195528 A1 | 6/2020 | Barton |
| 2020/0210150 A1 | 7/2020 | Creti |
| 2020/0210377 A1 | 7/2020 | Struck |
| 2020/0233403 A1 | 7/2020 | Gelbke |
| 2020/0233650 A1 | 7/2020 | Rajendran |
| 2020/0245210 A1 | 7/2020 | Fotheringham |
| 2020/0257566 A1 | 8/2020 | Ganguli |
| 2020/0272912 A1 | 8/2020 | Chacko |
| 2020/0288309 A1 | 9/2020 | Tran |
| 2020/0296172 A1 | 9/2020 | Gunjal |
| 2020/0322225 A1 | 10/2020 | Alamouti |
| 2020/0341876 A1 | 10/2020 | Gandhi |
| 2020/0344290 A1 | 10/2020 | Krishnaswamy |
| 2020/0351332 A1 | 11/2020 | Palladino |
| 2020/0351368 A1 | 11/2020 | Walsh |
| 2020/0351392 A1 | 11/2020 | Bomma |
| 2020/0358757 A1 | 11/2020 | Kulkarni |
| 2020/0358876 A1 | 11/2020 | Kulkarni |
| 2020/0366574 A1 | 11/2020 | Schubert |
| 2020/0366580 A1 | 11/2020 | Sinha |
| 2020/0366758 A1 | 11/2020 | Chauhan |
| 2020/0389517 A1 | 12/2020 | Eloy |
| 2020/0403853 A1 | 12/2020 | Garipally |
| 2021/0014133 A1 | 1/2021 | Maciocco |
| 2021/0026646 A1 | 1/2021 | Jha |
| 2021/0042160 A1 | 2/2021 | Alamouti |
| 2021/0042207 A1 | 2/2021 | Joyce |
| 2021/0058455 A1 | 2/2021 | Kozhaya |
| 2021/0072965 A1 | 3/2021 | Masters |
| 2021/0081271 A1 | 3/2021 | Doshi |
| 2021/0103392 A1 | 4/2021 | Murray |
| 2021/0117249 A1 | 4/2021 | Doshi |
| 2021/0157710 A1 | 5/2021 | Alexander |
| 2021/0165680 A1 | 6/2021 | Laschinger |
| 2021/0173730 A1 | 6/2021 | Acosta |
| 2021/0182996 A1 | 6/2021 | Cella |
| 2021/0211363 A1 | 7/2021 | Papacica |
| 2021/0234930 A1 | 7/2021 | Dinh |
| 2021/0240544 A1 | 8/2021 | Ramachandran |
| 2021/0240551 A1 | 8/2021 | Joyce |
| 2021/0243247 A1 | 8/2021 | He |

(56) References Cited

U.S. PATENT DOCUMENTS

| | | |
|---|---|---|
| 2021/0250361 A1 | 8/2021 | Leibmann |
| 2021/0258212 A1 | 8/2021 | Sangeeta |
| 2021/0266262 A1 | 8/2021 | Subramanian |
| 2021/0311798 A1 | 10/2021 | Desai |
| 2021/0326192 A1 | 10/2021 | Parkinson |
| 2021/0329100 A1 | 10/2021 | Knight |
| 2021/0377363 A1 | 12/2021 | Garaga |
| 2021/0390002 A1 | 12/2021 | Shah |
| 2021/0406102 A1 | 12/2021 | Seetharaman |
| 2022/0021538 A1 | 1/2022 | Madisetti |
| 2022/0021711 A1 | 1/2022 | Marsh |
| 2022/0029889 A1 | 1/2022 | Venkatramani |
| 2022/0036301 A1 | 2/2022 | Cella |
| 2022/0046292 A1 | 2/2022 | Nair |
| 2022/0058012 A1 | 2/2022 | Kaushik |
| 2022/0060526 A1 | 2/2022 | Jónsson |
| 2022/0128982 A1 | 4/2022 | Mansfield |
| 2022/0141304 A1 | 5/2022 | Gefen |
| 2022/0164700 A1 | 5/2022 | Shrivastava |
| 2022/0207163 A1 | 6/2022 | Gentleman |
| 2022/0210218 A1 | 6/2022 | Nomura |
| 2022/0225065 A1 | 7/2022 | Doken |
| 2022/0253788 A1 | 8/2022 | Hingne |
| 2022/0256011 A1 | 8/2022 | Cai |
| 2022/0300502 A1 | 9/2022 | Enver |
| 2022/0308925 A1 | 9/2022 | Shilane |
| 2022/0311773 A1 | 9/2022 | Zhou |
| 2022/0342997 A1 | 10/2022 | Watanabe |
| 2022/0345518 A1 | 10/2022 | Sgobba |
| 2022/0350617 A1 | 11/2022 | Hotham |
| 2022/0394083 A1 | 12/2022 | Pangeni |
| 2022/0407866 A1 | 12/2022 | Tanutama |
| 2023/0022048 A1 | 1/2023 | Miedema |
| 2023/0052827 A1 | 2/2023 | Araujo |
| 2023/0064543 A1 | 3/2023 | Gault |
| 2023/0077240 A1 | 3/2023 | Sawazaki |
| 2023/0082375 A1 | 3/2023 | Zhou |

OTHER PUBLICATIONS

Andrews et al., "Enabling Fine-Grained Access Control in Flexible Distributed Object-aware Process Management Systems" IEEE 21st International Enterprise Distributed Object Computing Conference, IEEE Computer Society, pp. 143-152 (Year: 2017).

Faraji et al., "Identity Access Management for Multi-Tier cloud Infrastructures" IEEE, pp. 1-9 (Year: 2014).

* cited by examiner

500

ENABLING AN ACTION BASED ON A PERMISSION IDENTIFIER FOR REAL-TIME IDENTITY RESOLUTION IN A DISTRIBUTED SYSTEM

CROSS REFERENCE TO OTHER APPLICATIONS

This application claims priority to U.S. Provisional Patent Application No. 63/247,148 entitled MECHANISM FOR REAL-TIME IDENTITY RESOLUTION IN A DISTRIBUTED SYSTEM filed Sep. 22, 2021 which is incorporated herein by reference for all purposes.

BACKGROUND OF THE INVENTION

A system for big data processing comprises a system for receiving data, storing data, processing data, etc. Big data processing systems typically comprise a large number of elements in one or more datasets. At scale, the number of transactions (e.g., queries) performed with respect to the one or more datasets is very large. In connection with performing a particular transaction, big data processing generally distributes processing of operations across various nodes within the system. Processing each transaction can include performing one or more actions with respect to the one or more datasets. As a node determines to perform an action, the node generally queries a centralized authenticator to validate the request and to confirm that the system is permitted to perform the action. However, this creates a problem in that the centralized authenticator becomes a bottleneck especially as the system scales to handle larger and larger numbers of transactions.

BRIEF DESCRIPTION OF THE DRAWINGS

Various embodiments of the invention are disclosed in the following detailed description and the accompanying drawings.

DETAILED DESCRIPTION

Figure 1:
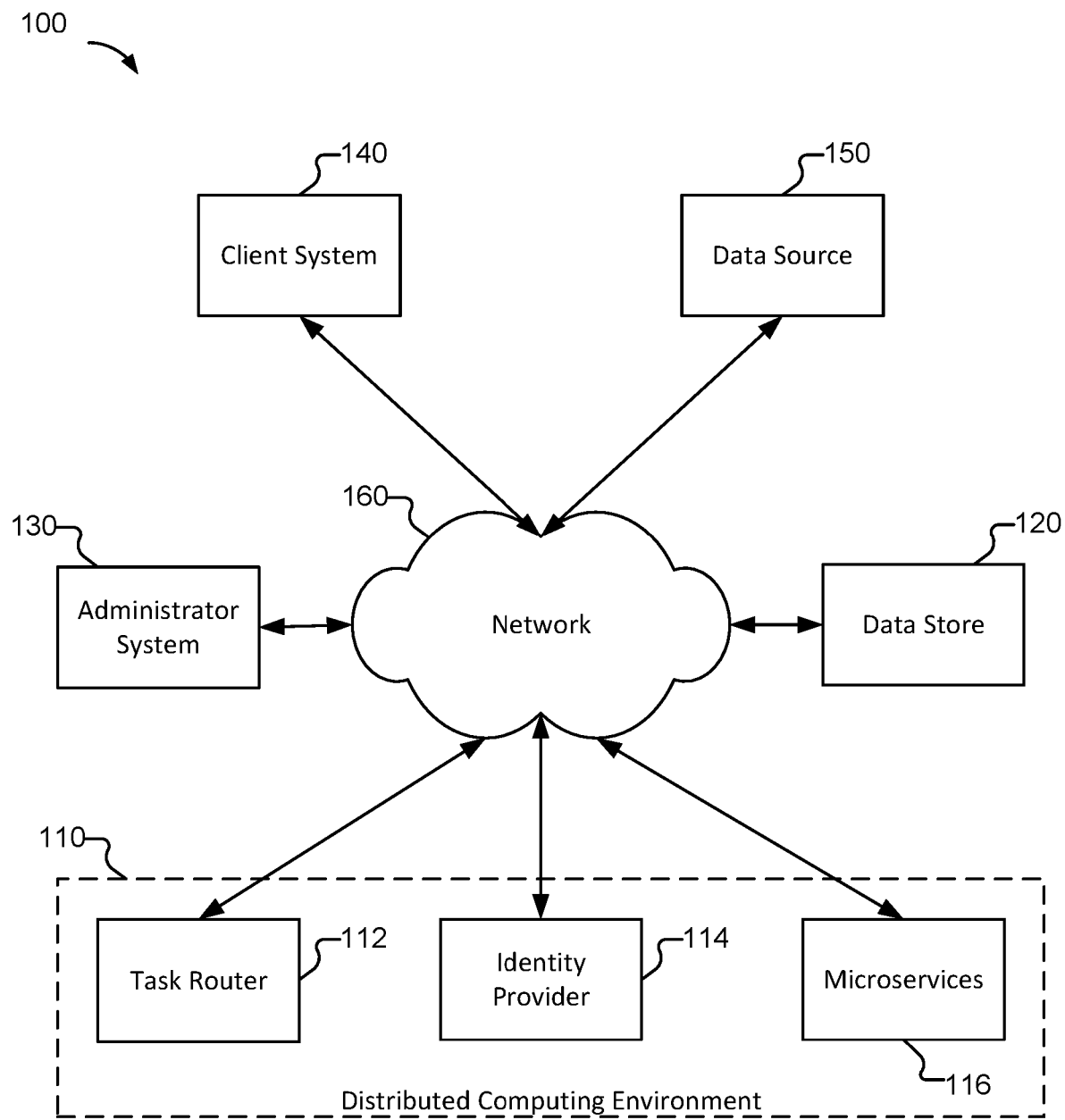
FIG. 1 is a block diagram of a system for performing actions in a distributed computing environment according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an identity provider may include a compute resource that is configured to determine permissions with respect to performing a task or request on behalf of a requesting entity.

As used herein, a microservice may include one or more compute resources that provide a service for a distributed computing environment. The microservice may be implemented by one or more worker nodes in a cluster of virtual machines. In some embodiments, the microservice provides the service (e.g., performs a task) in response to receiving a request from a requesting entity, from another microservice performing a task on behalf of the requesting entity, etc.

As used herein, a task router may include a compute resource that receives one or more requests from one or more requesting entities and routes the requests to one or more microservices in connection with generating a response to the requests. The task router may select a microservice to which to route the request (or a task corresponding to the request) based on a capability of the microservice and the specific request (or task corresponding to the request).

As used herein, a requesting entity may include a user, a client system used by a user, or other system that is performing an operation on behalf of the user. In some embodiments, the requesting entity corresponds to a group of users, such as based on a type of user, a role of the users, job function, an organization or department with which users are associated, etc.

As used herein, a task may include one or more actions or operations that are to be performed by a microservice such as in connection with providing a service to a requesting entity or to another microservice.

According to various embodiments, a system, method, and/or device for communicating information between a parent node and a child node, or for providing a recovery mechanism for such information, is disclosed. The system comprises one or more processors and a memory. The one or more processors are configured to (i) receive, by an identity provider, an indication of a set of capabilities for a plurality of microservices comprised in a distributed computing environment, (ii) determine, by the identity provider, a set of permissions for actions permitted for a requesting entity, (iii) generate, by the identity provider, a permissions identifier comprising an indication of the set of permissions permitted for the requesting entity, and (iv) provide, by the identity provider, the permissions identifier to one or more microservices of the plurality of microservices.

According to various embodiments, a system, method, and/or device for communicating information between a parent node and a child node, or for providing a recovery mechanism for such information, is disclosed. The system comprises one or more processors and a memory. The one or more processors are configured to (i) receive, by a microservice comprised in a distributed computing environment, a permissions identifier comprising an indication of the set of permissions permitted for a requesting entity, (ii) receive, by the microservice, a request to perform one or more actions on behalf of the requesting entity, (iii) determine whether the permissions identifier enables performing the one or more actions on behalf of the requesting entity, (iv) in response to determining that the permissions identifier enables performing the one or more actions on behalf of the requesting entity, perform the one or more actions, and provide to the requesting entity one or more results for the one or more actions.

Related art systems in which users or requesting entities are authenticated in connection with processing an incoming request are inefficient because such related art systems rely on a centralized authenticator to validate the requests to confirm whether the system is permitted to perform the action (e.g., to validate whether a user has the requisite permissions for such information or to request such action). As the number of requests across the system increases, the centralized authenticator in related art systems can become a bottleneck and cause latency in processing the requests. For example, at scale the number of requests processed by the system is sufficiently large thereby putting undue stress on the centralized authenticator which thereby causes a decrease in the quality of service with respect to processing requests.

Various embodiments cure the deficiencies of the related art systems based at least in part on decentralizing authentication of requests (or requesting entities on behalf of which the requests are being processed). In some embodiments, the various microservices within the system (e.g., a distributed computing environment) perform the authentication with respect to determining whether the requesting entity (e.g., the user) has requisite permissions for the request (e.g., whether the requesting entity has permission to request the task or to receive/view information responsive to the task, etc.). A microservice may locally authenticate a request to perform a task based at least in part on a permissions identifier stored at the microservice or at a storage accessible to the microservice. For example, the microservice receives the permissions identifier from the identity provider and uses the permissions identifier to determine whether the permissions identifier enables the microservice to perform the task on behalf of the requesting entity. The system improves the computer making the system faster by removing a bottleneck to performing actions by services to complete computations requested by a requestor.

In some embodiments, the identity provider generates a permissions identifier and communicates (e.g., pushes, broadcasts, etc.) the permissions identifier to one or more microservices. The identity provider may generate the permissions identifier based at least in part on one or more capabilities of the one or more microservices with which the permissions identifier is associated. As an example, the identity provider can generate a permissions identifier to be associated with a subset of all microservices within the distributed computing environment, such as a permissions identifier that is unique to a particular microservice or a permissions identifier that is unique to a type/class of microservice (e.g., a plurality of microservices having a same set of capabilities). As another example, the identifier can generate a permissions identifier to be associated with all microservices or a plurality of all microservices. If a permissions identifier is generated for a plurality of microservices, then the permission identifier may become unduly large (e.g., an object size exceeding a predefined size threshold). In some embodiments, the identity provider can split the permissions identifier or generate a plurality of permissions identifiers corresponding to various subsets of the microservices in the system in response to determining that the size of the permissions identifier (or expected size of the permissions identifier) exceeds the predefined size threshold. The identity provider can thereafter distribute the various permissions identifiers to the respective corresponding microservices. For example, the identity provider can configure the permissions identifier according to the microservice to which the permissions identifier is to be provided (or set of microservices to which the permissions identifier is to be provided).

In some embodiments, the identity provider generates a permissions identifier that is associated with a particular requesting entity (e.g., a user registered with the system) or a group of requesting entities (e.g., a set of users grouped by role, job function, department, type of user, etc.). As an example, the permissions identifier may be unique for the particular requesting entity or group of requesting entities. The permissions identifier can be associated with a single requesting entity or a subset of requesting entities. As an example, the permissions identifier may be associated with a single requesting entity and for one or more associated microservices. As another example, the permissions identifier may be associated with a plurality of requesting entities and for one or more associated microservices.

In response to generating the permissions identifier, the identity provider communicates the permissions identifier to one or more microservices such as for the microservice(s) to use the permissions identifier locally (e.g., without requiring the microservices to query the identity provider for authentication of a request to perform a task for each task). As an example, the identity provider broadcasts the permissions identifier and the applicable one or more microservices obtain the permissions identifier and store the permissions identifier for use in authenticating requests to perform tasks on behalf of one or more requesting entities. As another example, the identity provider communicates the permissions identifier directly to the one or more microservices with which the permissions identifier is associated.

According to various embodiments, the permissions identifier is generated in accordance with a predefined syntax or protocol. For example, the identity provider and a microservice can negotiate or otherwise define the syntax or protocol for the permissions identifier. The microservice can request a value indicating permissions of a requesting entity (or group of requesting entities) for each action the microservice can perform. Each action can be represented as a bit field in the permissions identifier. Examples of actions include generating a report, querying a dataset for responsive information, querying another microservice, etc. As another example, the syntax or protocol may be predefined by a system administrator such as by using a permissions identifier policy. In some embodiments, the permissions identifier is a bitstring or a bitmap. As an example, each bit in the bitstring or bitmap can correspond to a particular capability of, or service provided by, a microservice. The value in a bit can indicate whether the corresponding requesting entity has permissions for such capability/service. As an example, the bit can have a value of 0 or 1, and 0 can be used to indicate that the requesting entity does not have requisite permissions and 1 can be used to indicate that the requesting entity does have requisite permissions. In some embodiments, in an implementation according to which the permissions identifier is used for a plurality of microservices, a bit in the permissions identifier can correspond to a particular microservice. For example, the bit can correspond to a particular microservice and a particular capability/service of the microservice. In some embodiments, in an implementation according to which the permissions identifier is used for a plurality of requesting entities, a bit in the permissions identifier can correspond to a particular requesting entity. For example, the bit can correspond to a particular requesting entity and a particular capability/service of a microservice, or the bit in can correspond to a particular requesting entity, a particular microservice, and a particular capability/service of the particular microservice. In some embodiments, the permissions identifier includes a bit for each action that a requesting entity can take with respect to the particular microservice(s) (e.g., each capability supported by the microservice).

In some embodiments, a microservice receives a permissions identifier from the identity provider. The permissions identifier can correspond to one or more requesting entities, such as a set of users grouped according to role, type of user, department, etc. In response to receiving the permissions identifier, the microservice stores the received permissions identifier(s) in a cache or other memory that microservice can access in real-time (or near real-time). The microservice uses the permissions identifier in connection with locally determining whether the requesting entity associated with an action has the requisite permissions for the action (e.g., to receive results from the action). For example, the microservice determines the permissions identifier, or a part of a permissions identifier, corresponding to a particular requesting entity, and queries the permissions identifier for a value indicating permissions corresponding to the applicable action. In response to determining a result of querying the permissions identifier, the microservice determines whether to perform the action on behalf of the requesting entity. If the microservice determines to perform the action on behalf of the requesting entity, the microservice performs the action. Conversely, if the microservice determines that the requesting entity does not have the requisite permissions and/or that the microservice is not to perform the action on behalf of the requesting entity, then the microservice does not perform the action and the microservice may provide an indication to the requesting entity, or other microservice that queried the microservice to perform the action, that the requesting entity does not have requisite permissions for such action.

The querying the permissions identifier can include determining a bit field corresponding to the particular action (e.g., a bit field corresponding to a particular requesting entity, a particular action, and a particular microservice). Each bit field can correspond to a permutation of the various actions that can be performed. For example, if an action is to generate a report comprising a plurality of fields, the permissions identifier can include a bit field for each permutation of the plurality of fields or information that can be represented in the report. A subset of one or more fields in the plurality of fields may include personal identifiable information (PII) and a subset of one or more fields in the plurality of fields can include non-PII information. In some embodiments, the permissions identifier includes a bit field corresponding to permissions for PII information or a particular field that comprises PII, and a bit field corresponding to non-PII information or a particular field that comprises non-PII. The microservice can use the permissions identifier to determine an extent to which the requesting entity has permission for an action, and in response to determining the extent that the requesting entity has permission for the action, to perform the action according to such extent. For example, if the action is to generate a report that includes PII and non-PII, if the permissions identifier indicates that the user does not have permission for the PII but does have permission for non-PII, then the microservice can generate the report to include only non-PII (e.g., the PII fields are left blank or otherwise excluded from the report). As another example, if the action is to generate a report that includes PII and non-PII, if the permissions identifier indicates that the user does have permissions for both PII and non-PII, then the microservice can generate the report to include both the PII and non-PII.

According to various embodiments, the identity provider receives an indication of capabilities supported by various microservices in the system and permissions for various requesting entities of the system (e.g., users, groups of users, etc.). The microservices within the system can communicate (e.g., broadcast) an indication of the capabilities respectively supported by the microservices. For example, a microservice can provide to the identity provider and/or task router an indication of the various actions that the microservice can perform. In some embodiments, the microservice communicates the indication of the capabilities supported by the microservice in response to determining that the set of supported capabilities has been modified (e.g., a capability has been added or removed) and/or in response to the microservice being activated (e.g., the microservice is newly added to the system). The microservice may periodically communicate the indication of the capabilities supported by the microservice according to a predefined frequency. Similarly, a system or service that manages permissions for various requesting entities in the system can communicate an indication of a set of permissions for one or more requesting entities. For example, the indication of the set of permissions for one or more requesting entities is communicated to the identity provider in response to a set of permissions for a particular requesting entity being modified and/or in response to a requesting entity being added or removed from the system (e.g., a new user is registered or an existing user is deleted, etc.). In some embodiments, the identity provider periodically updates the permissions identifier according to a predefined frequency or update policy. Additionally, or alternatively, in some embodiments, the identity provider updates the permissions identifier in response to receiving an updated/new indication of capabilities supported by one or more microservices or an update/new indication of permissions for one or more requesting entities.

Various embodiments include a task router that receives a request to perform a task or other system communication (e.g., an update to registration of requesting entities or a mapping of requesting entities to permissions, etc.) and routes requests or other communications to various microservices within the system and/or the identity provider. The task router may receive the indication of the capabilities supported by various microservices within the system. For example, in the case that a microservice broadcasts an indication of the capabilities supported by the microservice (e.g., an indication of the various actions that the microservice can perform), the task router can receive the indication of the supported capabilities and store the corresponding information for use in routing requests to microservices. The task router can store a mapping of capabilities (e.g., supported tasks) to microservices. In response to receiving a request to perform a task, the task router queries the mapping of capabilities to microservices and determines the microservice within the system to which to route the request. In response to determining the microservice to which to route the request, the task router communicates the request to the microservice. The microservice may return to the task router a result corresponding to the request to perform the task (e.g., a result of performing the task). In response to receiving the result, the task router can route the result to the entity from which the request was received (e.g., a requesting entity, another microservice, etc.).

In some embodiments, the task router performs a validation to confirm that the requesting entity has requisite permissions for the result of the request to perform the task. For example, the task router receives a permissions identifier from the identity provider and stores the permissions identifier in a cache or other memory that is accessible to the task router in real-time (or near real-time). In response to receiving the result from the microservice, the task router can query the applicable permissions identifier (e.g., the permissions identifier corresponding to the requesting entity and microservice) to validate that the requesting entity has requisite permissions for the result and propagates the result to the requesting entity (or other microservice) if the requesting entity does have requisite permissions. As an example, permissions for a requesting entity may change over time, such as between a time that a request to perform a task and the task router receiving the corresponding result from the microservice. Accordingly, the permission identifier used by the microservice in connection with authenticating the requesting entity when performing the task may be outdated by the time the result is to be propagated to the requesting entity by the task router. If the task router is configured to receive permissions identifiers and to validate that requesting entities have the requisite permissions to obtain the results to the tasks, the task router may implement an updated permissions identifier that is received (e.g., from the identity provider) between the time at which the request to perform the task is received and the time at which the result is received by the task router.

According to various embodiments, the microservice receives updates to the permissions identifier(s) and uses the updated permissions identifier(s) in connection with authenticating a requesting entity and/or generating a result to the request to perform the task. The microservice can continuously (e.g., periodically according to a predefined frequency or in response to receiving updated permissions identifier(s)) authenticate the requesting entity associated with a request to perform a task. Thus, if the permissions identifier for the requesting entity is updated mid-workflow in processing the task, the microservice can authenticate the requesting entity against the updated permissions identifier before providing a result to the task (e.g., providing the result to the task router, etc.). In response to determining that the updated permissions identifier indicates that the requesting entity no longer has full permissions for the results, the microservice can update the result in accordance with an extent to which the requesting entity has permissions (if any).

Various embodiments improve the efficiency of processing tasks in a distributed computing environment. For example, various embodiments provide a distributed authentication mechanism that does not rely on a centralized authenticator to authenticate a user in connection with each session or request for the user. In addition, various embodiments distribute updated permissions identifiers for authentication of users by microservices in near real-time with updates to capabilities supported by the microservices or permissions for requesting entities.

FIG. 1 is a block diagram of a system for performing actions in a distributed computing environment according to various embodiments of the present application. According to various embodiments, system 100 implements at least part of process 400 of FIG. 4, process 500 of FIG. 5, process 600 of FIG. 6, process 700 of FIG. 7, and/or process 800 of FIG. 8.

In the example illustrated in FIG. 1, system 100 includes distributed computing environment 110, data store 120, administrator system 130, client system 140, and/or data source 150. In some embodiments, distributed computing environment 110 and/or data source 150 are integrated (e.g., combined into a layer or a single set of servers). System 100 further includes one or more networks such as network 160 over which administrator system 130 and/or client system 140 communicates with distributed computing environment 110, data store 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, distributed computing environment 110 comprises task router 112, identity provider 114, and/or microservices 116. Task router 112, identity provider 114, and/or microservices 116 can be respectively implemented by one or more servers. For example, microservices 116 can be implemented by a cluster of virtual machines (e.g., each microservice can be implemented by a worker node in the cluster, etc.). In some embodiments, system 100 comprises a plurality of task routers 112 and/or identity providers 114 that respectively process data pertaining to various tenants or customers. For example, each data layer can be implemented for a different tenant or customer.

According to various embodiments, distributed computing environment 110 provides one or more services with respect to one or more datasets, such as datasets stored at data store 120. Distributed computing environment 110 uses microservices 116 to process requests received from a user such as via client system 140. Distributed computing environment 110 can use task router 112 to receive queries or other requests (e.g., from a user such as via client system 140) and to route the queries or other requests to the applicable microservice comprised in microservices 116. Distributed computing environment 110 uses identity provider 114 to determine permissions for users in system 100 (e.g., users registered with distributed computing environment 110) and to provide information (e.g., one or more permissions identifier) to microservices 116 to enable microservices to authenticate requests (e.g., determine whether a microservice can perform an action on behalf of a requesting entity).

In some embodiments, system 100 uses task router 112 to receive a request to perform a task or other system communication (e.g., an update to registration of requesting entities or a mapping of requesting entities to permissions, etc.) and to route requests or other communications to various microservices 116 and/or the identity provider 114. Task router 112 may receive the indication of the capabilities supported by microservices 116. For example, in the case that a microservice broadcasts an indication of the capabilities supported by the microservice (e.g., an indication of the various actions that the microservice can perform), task router 112 can receive the indication of the supported capabilities and store the corresponding information for use in routing requests to microservices. In response to receiving a request to perform a task, task router 112 queries the mapping of capabilities to microservices and determines the microservice within distributed computing environment 110 to which to route the request. In response to determining the microservice to which the request is routed, task router 112 communicates the request to the microservice. The microservice may return to task router 112 a result corresponding to the request to perform the task (e.g., a result of performing the task). In response to receiving the result, task router 112 can route (e.g., propagate) the result to the entity from which the request was received (e.g., a requesting entity such as client system 140, another microservice, etc.).

In some embodiments, task router 112 validates that the requesting entity has the requisite permissions to access the results from microservices 116 performing a particular task. For example, task router 112 receives a permissions identifier from the identity provider and stores the permissions identifier in a cache or other memory that is accessible to task router 112 in real-time (or near real-time). In response to receiving the result from the microservice (e.g., a microservice of microservices 116), task router 112 can query the applicable permissions identifier (e.g., the permissions identifier corresponding to the requesting entity and microservice) to validate that the requesting entity (e.g., client system 140) has requisite permissions for the result, and propagates the result to the requesting entity (or other microservice) if the requesting entity does have the requisite permissions.

In some embodiments, in response to receiving a request from a requesting entity (or another microservice on behalf of a requesting entity), task router 112 provides to identity provider 114 an indication that the request for the task is received from (or on behalf of) the requesting entity. Task router 112 can provide an indication of the requesting entity or session identifier (e.g., information from which the requesting entity can be determined/looked up) in connection with the indication that the request for the task is received. Communicating the indication of receipt of the request can trigger identity provider 114 to determine whether the applicable permissions identifier is to be updated (e.g., based on a change of capabilities of microservices that may service the request or a change of permissions for the requesting entity, etc.). In response to determining that the permissions identifier is to be updated, identity provider 114 updates the permissions identifier and provides the updated permissions identifier to task router 112 and/or one or more applicable microservice of microservices 116.

According to various embodiments, distributed computing environment 110 uses identity provider 114 to obtain permissions for various requesting entities and to provide information pertaining to the permissions to microservices 116. In some embodiments, identity provider 114 generates a permissions identifier that indicates permissions for a requesting entity (or a plurality of requesting entities) with respect to one or more capabilities (e.g., supported tasks/actions) that are supported by one or more microservices. Identity provider 114 provides the permissions identifier to microservices 116 to enable microservices 116 to locally authenticate requests for a microservice to perform a task on behalf of a requesting entity. Identity provider 114 updates the permissions identifier(s) periodically (e.g., according to a predefined frequency) and/or in response to one or more of an update to requesting entity permissions, a registration of new requesting entity, a registration of a new microservice, an update/change to a set of capabilities supported by a microservice, etc.

According to various embodiments, distributed computing environment 110 uses microservices 116 to provide one or more services to a requesting entity (e.g., a user of client system 140) or another system or microservice. The one or more services can include accessing, querying, and/or manipulating data stored in one or more datasets (e.g., a dataset stored at data store 120) or data obtained from data source 150 (e.g., a third-party service such as a service that provides a stream of data, etc.). A microservice (e.g., a microservice comprised in microservices 116) receives a request to perform a task on behalf of a requesting entity (e.g., a user registered with system 100). For example, the microservice receives the request to perform a task from task router 112 and/or another microservice in distributed computing environment 110. Examples of services (e.g., capabilities, actions, tasks, etc.) provided by a microservice include generating a report, querying one or more datasets, configuring information, performing a computation, etc. Various other services may be provided.

According to various embodiments, system 100 comprises data store 120. System 100 uses data store 120 to store one or more datasets comprising data entities and data for the data entities. Data store 120 can store datasets for a plurality of tenants or customers serviced by distributed computing environment 110.

According to various embodiments, system 100 comprises administrator system 130 for use by an administrator such as an administrator of distributed computing environment 110 or an administrator of a user associated with data store 120 and/or a distributed computing environment 110. For example, administrator system 130 comprises a system for communication, data access, computation, etc. An administrator uses administrator system 130 to maintain a dataset stored in data store 120, to define and manage applications provided by system 100, to set data management policies, to set requesting entity permissions (e.g., user permissions), to register requesting entities (e.g., users), to set a syntax or protocol according to which a permission identifier is to be configured, to set or configure microservices 116 such as to set capabilities of a microservice, to provide various system configurations or settings, etc. For example, an administrator uses administrator system 130 to define one or more security policies that are to be enforced (e.g., by task router 112, identity provider 114, and/or microservices 116) with respect to a data stored at data store 120. In some embodiments, administrator system 130 communicates with distributed computing environment 110 via a web-interface (e.g., by using a web browser, etc.). For example, administrator system 130 communicates with distributed computing environment 110 via a web-browser installed on administrator system 130 (e.g., via a user interface configured by an application running on distributed computing environment 110). In some embodiments, administrator system 130 communicates with distributed computing environment 110 via an application or service running on administrator system 130 (e.g., a connector or Application Programming Interface (API) corresponding to distributed computing environment 110).

According to various embodiments, system 100 comprises client system 140. Client system 140 is used by a user such as a user corresponding to a data recipient (e.g., a developer such as a developer of code, a developer of a model, a user consuming the information ingested by distributed computing environment 110 processing data received from data source 150 or data store 120, a user of an organization associated with a one or more datasets stored at data store 120, etc.) to communicate with distributed computing environment 110 (e.g., task router 112, identity provider 114, and/or microservices 116) and/or data stored in data store 120. As an example, client system 140 communicates with distributed computing environment 110 via a web-interface. In some embodiments, client system 140 communicates with distributed computing environment 110 via an application or service running on client system 140 (e.g., a module such as a connector or API that interfaces with distributed computing environment 110). In some embodiments, a user uses client system 140 to develop code on a business application layer, which makes a call to with respect to data exposed via distributed computing environment 110, or to invoke a task to be performed with respect to certain data stored in data store 120 (e.g., to update a dataset, to generate a report based on data comprised in the dataset, etc.), to modify code at a business application (e.g., to execute code against data stored in data store 120), to query data store 120 or a data share corresponding to a subset of data (e.g., data objects) within data store 120 (e.g., in connection with discovering code, a library, a module, etc.), etc.

According to various embodiments, system 100 comprises data source 150. Data source 150 can provide data to be processed by distributed computing environment 110 and stored in datasets on data store 120. For example, distributed computing environment 110 can ingest data provided by data source 150.

Figure 2:
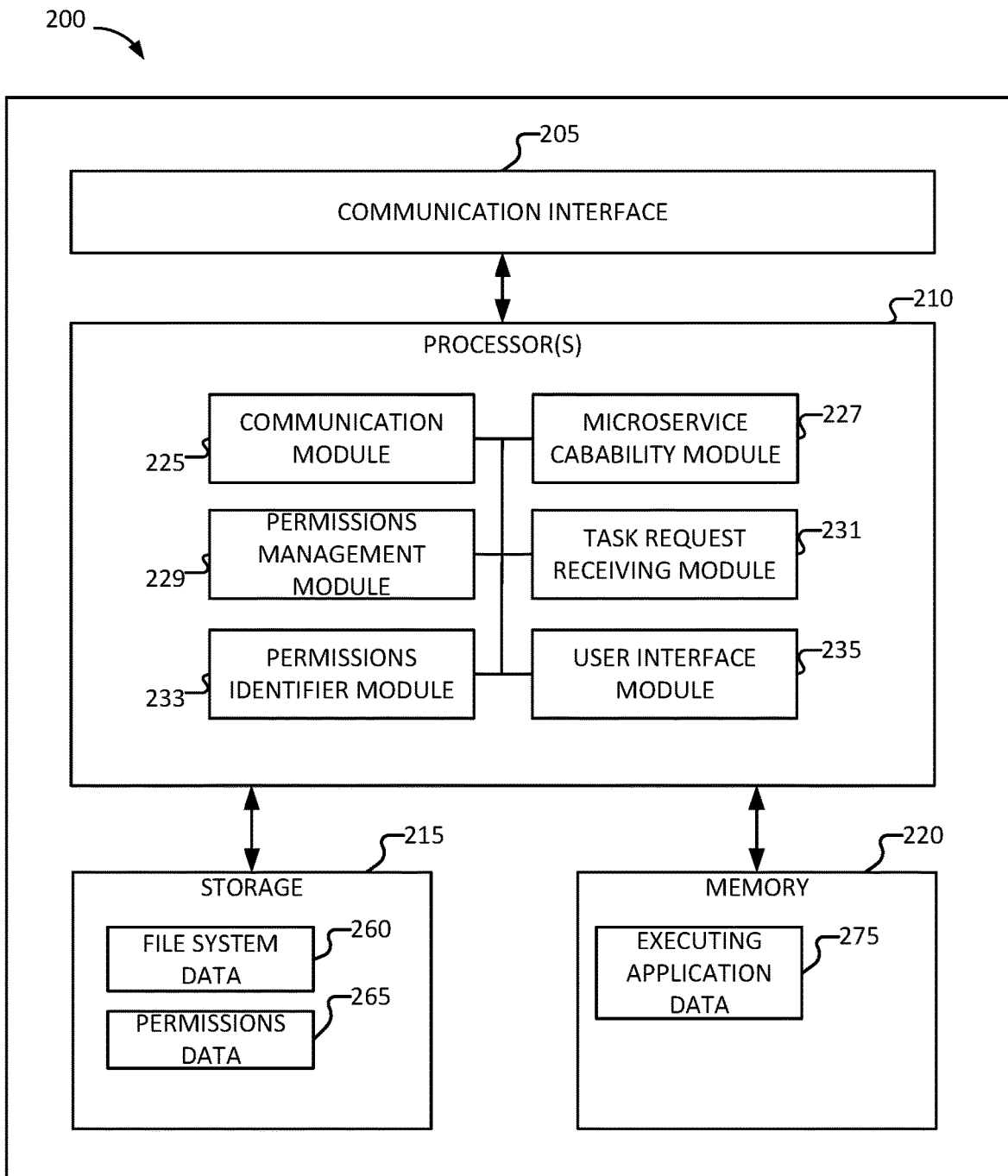
FIG. 2 is a block diagram of an identity provider according to various embodiments of the present application.

FIG. 2 is a block diagram of an identity provider according to various embodiments of the present application. According to various embodiments, system 200 implements at least part of process 400 of FIG. 4, process 500 of FIG. 5, process 600 of FIG. 6, process 700 of FIG. 7, and/or process 800 of FIG. 8.

According to various embodiments, system 200 corresponds to an identity provider, such as identity provider 114 of distributed computing environment 110 of FIG. 1. System 200 enforces one or more security policies, such as by providing microservices with information based on which the microservices can perform local authentication of a requesting entity or otherwise determine whether a requesting entity (e.g., a user) has permission to obtain a result of the task performed by the microservices (e.g., to determine whether a permissions identifier for the user enables the microservice to perform the action on behalf of the user, etc.).

In the example shown, system 200 implements one or more modules in connection with providing services in a distributed computing environment, enforcing security policies, authenticating users, etc. System 200 comprises communication interface 205, one or more processors 210, storage 215, and/or memory 220. One or more processors 210 comprises, or implements, one or more of communication module 225, microservice capability module 227, permissions management module 229, task request receiving module 231, permissions identifier module 233, and/or user interface module 247.

In some embodiments, system 200 comprises communication module 225. System 200 uses communication module 225 to communicate with various other systems such as a user system, an administrator system, a data source (e.g., from which a file(s) comprising information to be ingested are received), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request to configure a security policy, a request for entity registrations (e.g., user registrations), a request for entity permissions (e.g., user permissions), capabilities supported by a microservice, a permissions identifier syntax or protocol, an indication for receipt of a request for performing a task on behalf of a requesting entity, a storage system configuration such as a configuration for a partitioning of data, a configuration of metadata associated with a dataset, a query for data, a selection of a corrective action, etc. Communication module 225 is configured to provide various microservices and/or task routers with permissions identifiers associated with a user and/or microservice, user systems or data requesting services with information such as a user interface (e.g., an interface via which security policies can be configured, user permissions are set, etc.), etc.

In some embodiments, system 200 comprises microservice capability module 227. System 200 uses microservice capability module 227 to manage capabilities supported by the various microservices in a distributed computing environment or other system, such as system 100 of FIG. 1. Microservice capability module 227 can store a mapping of microservices to supported capabilities (e.g., actions or tasks that a microservice can provide). System 200 can use microservice capability module 227 to determine one or more capabilities associated with (e.g., supported by) a microservice, such as in connection with generating a permissions identifier and/or determining whether to update a permissions identifier, etc. For example, microservice capability module 227 receives updates to capabilities supported by a microservice and/or an indication of a set of capabilities supported by a newly deployed/registered microservice (e.g., within the distributed computing environment, etc.).

In some embodiments, system 200 comprises permissions management module 229. System 200 uses permissions management module 229 to manage permissions for various requesting entities such as users registered with a distributed computing environment, or other systems, such as system 100 of FIG. 1. Permissions management module 229 can store a mapping of requesting entities (e.g., users) to permissions for capabilities supported by one or more microservices. System 200 can use permissions management module 229 to determine requesting entity permissions with respect to capabilities supported by one or more microservices, such as in connection with generating a permissions identifier and/or determining whether to update a permissions identifier, etc. For example, permissions management module 229 receives updates to permissions for one or more requesting entities and/or an indication of a new requesting entity registered with the system (e.g., a new user associated with the distributed computing environment, etc.) and corresponding permissions for the new requesting entity.

In some embodiments, system 200 comprises task request receiving module 231. System 200 uses task request receiving module 231 to determine whether a task request (e.g., a request for a microservice to perform a task on behalf of a requesting entity) is received. Task request receiving module 231 may receive (e.g., from a task router in the system) the task request or an indication that the system received the task request. System 200 can use the determination that a task request is received in connection with triggering system 200 (e.g., permissions identifier module 233) to generate a permissions identifier for the corresponding requesting entity (e.g., the user for whom the task is to be performed) or to update a permissions identifier for the requesting entity.

In some embodiments, system 200 comprises permissions identifier module 233. System 200 uses permissions identifier module 233 to manage permissions identifiers for one or more requesting entities and/or one or more microservices (or capabilities supported by microservices). Permissions identifier module 233 can generate a permissions identifier associated with a user. In response to generating/updating the permissions identifier, permissions identifier module 233 stores the permissions identifier (e.g., in association with a mapping of requesting entities to permissions identifiers, etc.) and provides the permissions identifier to communication module 225 for communication (e.g., broadcast) to the microservices (e.g., the microservices with which the permissions identifier is associated). System 200 can also communicate the permissions identifier to a task router (e.g., the task router can use the permissions identifier to validate permissions of a requesting entity before propagating to the requesting entity a result from a microservice.

In some embodiments, permissions identifier module 233 generates the permissions identifier based at least in part on one or more capabilities of the one or more microservices with which the permissions identifier is associated. As an example, permissions identifier module 233 generates a permissions identifier to be associated with a subset of all microservices within the distributed computing environment, such as a permissions identifier that is unique to a particular microservice or a permissions identifier that is unique to a type/class of microservice (e.g., a plurality of microservices having a same set of capabilities). As another example, permissions identifier module 233 generates a permissions identifier to be associated with all microservices or a plurality of all microservices. If a permissions identifier is generated for a plurality of microservices, then the permission identifier may become unduly large (e.g., an object size exceeding a predefined size threshold). In some embodiments, permissions identifier module 233 splits the permissions identifier or generates a plurality of permissions identifiers corresponding to various subsets of the microservices in the system in response to determining that the size of the permissions identifier (or expected size of the permissions identifier) exceeds the predefined size threshold.

In some embodiments, permissions identifier module 233 generates a permissions identifier that is associated with a particular requesting entity (e.g., a user registered with the system) or a group of requesting entities (e.g., a set of users grouped by role, job function, department, type of user, etc.). As an example, the permissions identifier may be unique for the particular requesting entity or group of requesting entities. The permissions identifier can be associated with a single requesting entity or a subset of requesting entities. As an example, the permissions identifier may be associated with a single requesting entity and for one or more associated microservices. As another example, the permissions identifier may be associated with a plurality of requesting entities and for one or more associated microservices.

According to various embodiments, permissions identifier module 233 generates the permissions identifier in accordance with a predefined syntax or protocol. For example, system 200 and a microservice can negotiate or otherwise define the syntax or protocol for the permissions identifier. The microservice can request a value indicating permissions of a requesting entity (or group of requesting entities) for each action the microservice can perform. Each action can be represented as a bit field in the permissions identifier. Examples of actions include generating a report, querying a dataset for responsive information, querying another microservice, etc. As another example, the syntax or protocol may be predefined by a system administrator such as by using a permissions identifier policy.

In some embodiments, the permissions identifier is a bitstring or a bitmap. As an example, each bit in the bitstring or bitmap can correspond to a particular capability of, or service provided by, a microservice. The value in the bit can indicate whether the corresponding requesting entity has permission for such capability/service. As an example, the bit can have a value of 0 or 1, and 0 can be used to indicate that the requesting entity does not have requisite permission(s) and 1 can be used to indicate that the requesting entity does have requisite permission(s). In some embodiments, in an implementation according to which the permissions identifier is used for a plurality of microservices, a bit in the permissions identifier can correspond to a particular microservice. For example, the bit can correspond to a particular microservice and a particular capability/service of the microservice. In some embodiments, in an implementation according to which the permissions identifier is used for a plurality of requesting entities, a bit in the permissions identifier can correspond to a particular requesting entity. For example, the bit can correspond to a particular requesting entity and a particular capability/service of a microservice, or the bit in can correspond to a particular requesting entity, a particular microservice, and a particular capability/service of the particular microservice. In some embodiments, the permissions identifier includes a bit for each action that a requesting entity can take with respect to the particular microservice(s) (e.g., each capability supported by the microservice).

In some embodiments, system 200 comprises user interface module 235. System 200 uses user interface module 235 to provide a user interface to a user (e.g., via a client system, etc.) via which the user configures security policies, defines user permissions (e.g., requesting entity permissions), configures a definition of a set of capabilities supported by a specification, configures a frequency according to which system 200 determines whether to update permissions identifiers and correspondingly updates the permissions identifiers, etc.

According to various embodiments, storage 215 comprises one or more of file system data 260 and permissions data 265. Storage 215 comprises a shared storage (e.g., a network storage system) and/or database data.

In some embodiments, file system data 260 comprises a database such as one or more datasets of capabilities supported by various microservices (e.g., a mapping of microservices to supported capabilities, etc.). File system data 260 can store various policies such as a security policy, a permissions identifier update policy, a permissions identifier syntax/protocol policy, etc.

In some embodiments, permissions data 265 comprises information pertaining to permissions of various requesting entities associated with a system such as system 100 of FIG. 1. Permissions data 265 can comprise an indication of a set of capabilities or tasks/actions for which a user is permitted to access/request.

According to various embodiments, memory 220 comprises executing application data 275. Executing application data 275 comprises data obtained or used in connection with executing an application such as an application executing in connection with managing permissions for requesting entities, an application executing in connection with managing permissions identifiers for requesting entities and/or microservices, an application executing in connection with distributing permissions identifiers to applicable microservices, an application executing in connection with determining whether to update a permissions identifier, etc. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
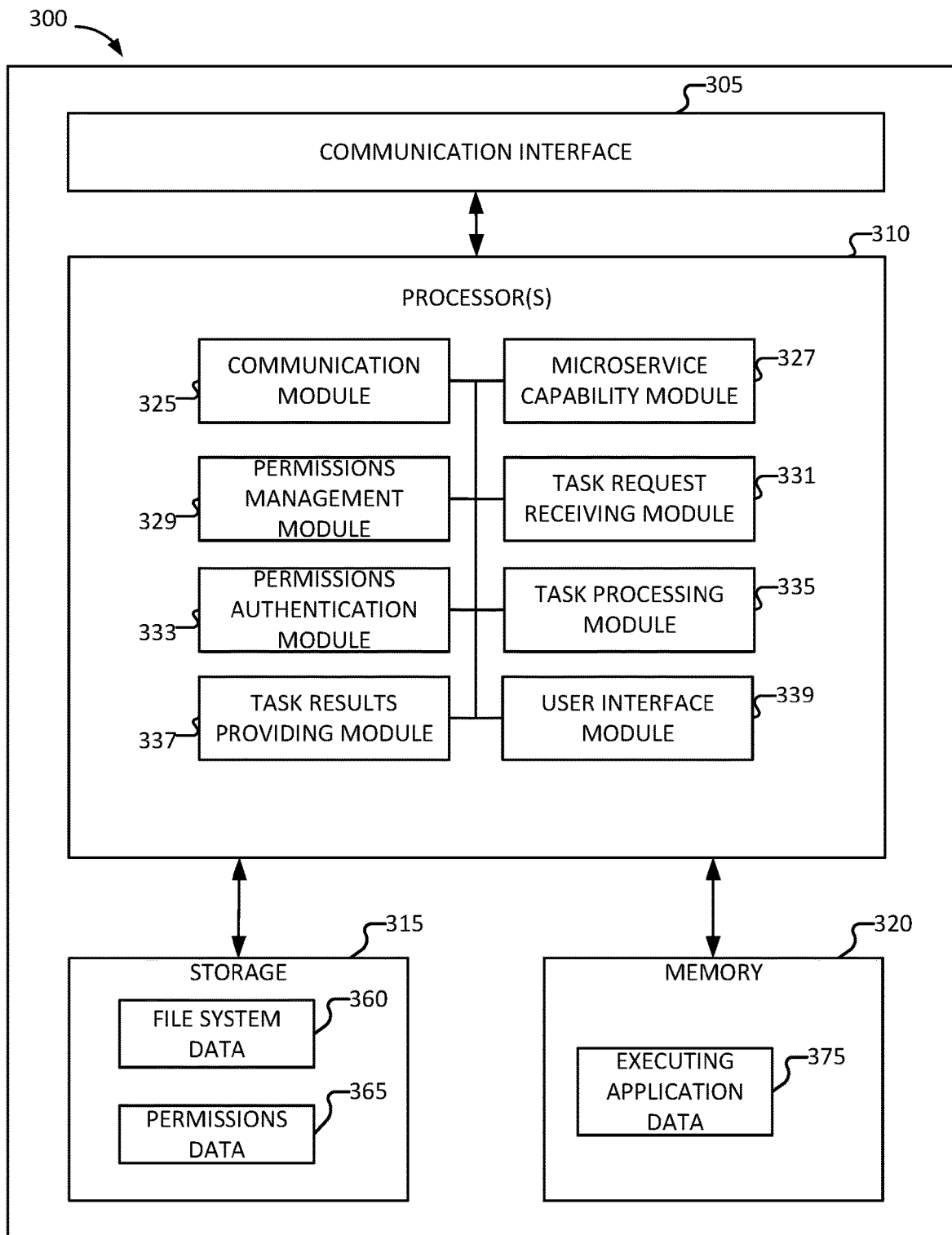
FIG. 3 is a block diagram of a microservice according to various embodiments of the present application.

FIG. 3 is a block diagram of a microservice according to various embodiments of the present application. According to various embodiments, system 300 implements at least part of process 400 of FIG. 4, process 500 of FIG. 5, process 600 of FIG. 6, process 700 of FIG. 7, and/or process 800 of FIG. 8.

According to various embodiments, system 300 corresponds to a microservice, such as a microservice of microservices 116 of distributed computing environment 110 of FIG. 1. System 300 enforces one or more security policies, such as by providing results to requests for tasks to be performed on behalf of a requesting entity based at least in part on a set of permissions associated with the requesting entity (e.g., based on the permissions identifier for the requesting entity, etc.).

In the example shown, system 300 implements one or more modules in connection with providing services in a distributed computing environment, enforcing security policies, authenticating users, etc. System 300 comprises communication interface 305, one or more processors 310, storage 315, and/or memory 320. One or more processors 310 comprises, or implements, one or more of communication module 325, microservice capability module 327, permissions management module 329, task request receiving module 331, permissions authentication module 333, task processing module 335, task results providing module 337, and/or user interface module 339.

In some embodiments, system 300 comprises communication module 325. System 300 uses communication module 325 to communicate with various other systems such as a user system, an administrator system, a data source (e.g., from which a file(s) comprising information to be ingested are received), an identity provider, a task router, and/or a data store (e.g., a distributed data storage system). For example, communication module 325 provides to communication interface 305 information that is to be communicated. As another example, communication interface 305 provides to communication module 325 information received by system 300. Communication module 325 is configured to receive user input to a user system such as a data access request, a request to configure a security policy, a request for capabilities supported by system 300, a request for an update to supported capabilities, a request for a status of processing a task, a permissions identifier syntax or protocol, an indication for receipt of a request for performing a task on behalf of a requesting entity, a storage system configuration, a configuration of metadata associated with a dataset, a query for data, a selection of a corrective action, etc. Communication module 325 is configured to provide one or more identity providers and/or task routers with an indication of capabilities supported by system 300, an update to the supported capabilities, an indication that system 200 is newly deployed/registered within a distributed computing environment, a result from processing a task (e.g., in response to a request to process a task), user systems or data requesting services with information such as a user interface (e.g., an interface via which security policies can be configured, user permissions are set, capabilities are set, etc.) information that is responsive to one or more queries or tasks requested to be executed, locations at which data is to be accessed, credentials for accessing data, URLs corresponding to locations at which data responsive to data access requests can be retrieved, etc. In some embodiments, communication module 325 communicates data responsive to requests for system 300 to perform a task (e.g., a task request such as information responsive to queries to a dataset, etc.).

In some embodiments, system 300 comprises microservice capability module 327. System 300 uses microservice capability module 327 to manage capabilities supported by system 300 (e.g., a microservice in a distributed computing environment such as distributed computing environment 110 of FIG. 1). Microservice capability module 327 can store an indication of supported capabilities (e.g., actions or tasks that a microservice can provide). System 300 can use microservice capability module 327 to communicate (e.g., broadcast) to an identity provider an indication of a set of capabilities supported by system 300, such as in connection with the identity provider generating a permissions identifier and/or determining whether to update a permissions identifier, etc. For example, microservice capability module 327 communicates updates to capabilities supported by a microservice and/or an indication of a set of capabilities supported by a newly deployed/registered microservice (e.g., within the distributed computing environment, etc.). In some embodiments, system 300 uses microservice capability module 327 to communicate the indication of the set of supported capabilities at a predefined interval/frequency and/or in response to a determination that the set of supported capabilities has changed.

In some embodiments, system 300 comprises permissions management module 329. System 300 uses permissions management module 329 to manage permissions information for one or more requesting entities. The permissions information can indicate whether a particular requesting entity has permission to request system 300 to perform a task or otherwise obtain/access a result of the performing such task. In some embodiments, permissions management module 329 receives and stores a permissions identifier corresponding to the permissions information. For example, permissions management module 329 stores a mapping of requesting entities to permissions identifiers (e.g., a mapping that can be queried to determine permissions for a requesting entity associated with a request to perform a task). In connection with performing a task in response to receiving a request for a requesting entity (e.g., via a task router), system 300 uses permissions management module 329 to determine and obtain the permissions information for the requesting entity and/or the particular tasks to be performed on behalf of the requesting entity. As an example, the permissions management module determines one or more bit fields (e.g., field(s) of a bitstring or bitmap) comprising permissions information for the requesting entity with respect to the particular tasks.

In some embodiments, system 300 comprises task request receiving module 331. System 300 uses task request receiving module 331 to receive requests for system 300 to perform a task on behalf of a requesting entity. Task request receiving module 331 can receive the requests from one or more task routers within a distributed computing environment. As an example, the requests include information from which system 300 can determine the corresponding requesting entities on behalf of which system 300 is being requested to perform the task. For example, the request includes a requesting entity identifier (e.g., a user identifier) that identifies the corresponding requesting entity, or a session identifier that system 300 can use to perform a lookup to determine a requesting entity associated with the session, etc.

In some embodiments, system 300 comprises permissions authentication module 333. System 300 uses permissions authentication module 333 to authenticate the performing the task on behalf of the requesting entity. Permissions authentication module 333 determines whether the permissions identifier for the requesting entity enables system 300 to perform the task on behalf of the requesting entity. For example, permissions authentication module 333 queries permissions management module 329 for the permissions identifier for the requesting entity or a part of the permissions identifier corresponding to the tasks that are being requested to be performed by system 300 (e.g., permissions authentication module 333 queries the permission management module 329 for the applicable bit fields of the permissions identifier). In response to receiving the permissions identifier (or applicable part of the permissions identifier), permissions authentication module 333 uses the permissions identifier to determine whether the requesting entity has requisite permissions to request system 300 to perform the task or to otherwise receive the results of the task. For example, permissions authentication module 333 uses a value in the bit field corresponding to the applicable tasks to determine whether the requesting entity has requisite permissions (or an extent of the permissions that the requesting entity has with respect to accessing subsets of results of the tasks). In some embodiments, permissions authentication module 333 performs a local authentication of a user associated with a request and performs the authentication contemporaneous with receipt of the request and/or performing the corresponding task. For example, permissions authentication module 333 can authenticate the request or requesting entity a plurality of times during the workflow of performing the task (e.g., to be able to enforce security policies in near real-time as permissions change over time).

In some embodiments, system 300 comprises task processing module 335. System 300 uses task processing module 335 to process a task on behalf of a requesting entity, such as in response to task request receiving module 331 receiving the request. Task processing module 335 can determine results for the task or a subset of results for the task for which the requesting entity has requisite permissions. Task processing module 335 can query permissions authentication module 333 to authenticate the request to perform the task or the requesting entity associated with the request. For example, task processing module 335 can query permissions authentication module 333 to authenticate the requesting entity before starting processing of the task, during processing of the task (e.g., as different operations constituting the task are completed/started), and/or after obtaining results for the task.

In some embodiments, system 300 comprises task results providing module 337. System 300 uses task results providing module 337 to provide the results for the task (or a subset of the results for the task for which the requesting entity has permissions). Task results providing module 337 provides (e.g., via communication module 325) the results to a task router, which can propagate the results to the requesting entity or to another microservice or other system that requested system 300 to perform the task on behalf of the requesting entity.

In some embodiments, system 300 comprises user interface module 339. System 300 uses user interface module 339 to provide a user interface to a user (e.g., via a client system, etc.) via which the user configures a microservice, defines capabilities supported by the microservice, configures a frequency according to which system 300 communicates (e.g., broadcasts) a current set of capabilities supported by the specification, etc.

According to various embodiments, storage 315 comprises one or more of file system data 360 and permissions data 365. Storage 315 comprises a shared storage (e.g., a network storage system) and/or database data.

In some embodiments, file system data 360 comprises a database such as one or more datasets storing results for tasks/actions performed by system 300 (e.g., the microservice), or capabilities supported by system 300. File system data 360 can store various policies such as a security policy, a supported capability update policy, a permissions identifier syntax/protocol policy, etc.

In some embodiments, permissions data 365 comprises information pertaining to permissions of various requesting entities associated with a system such as system 100 of FIG. 1. Permissions data 365 can comprise an indication of a set of permissions for a requesting entity with respect to a set of capabilities supported by system 300. In some embodiments, permissions data 365 stores a mapping of requesting entities to permissions identifiers.

According to various embodiments, memory 320 comprises executing application data 375. Executing application data 375 comprises data obtained or used in connection with executing an application such as an application executing in connection with managing capabilities supported by system 300, an application executing in connection with managing permissions identifiers for requesting entities, an application executing in connection with communicating an indication of a set of capabilities supported by system 300, an application executing in connection with enforcing a security policy based on permissions for a requesting entity, an application executing in connection with receiving a permissions identifier(s), etc. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 4:
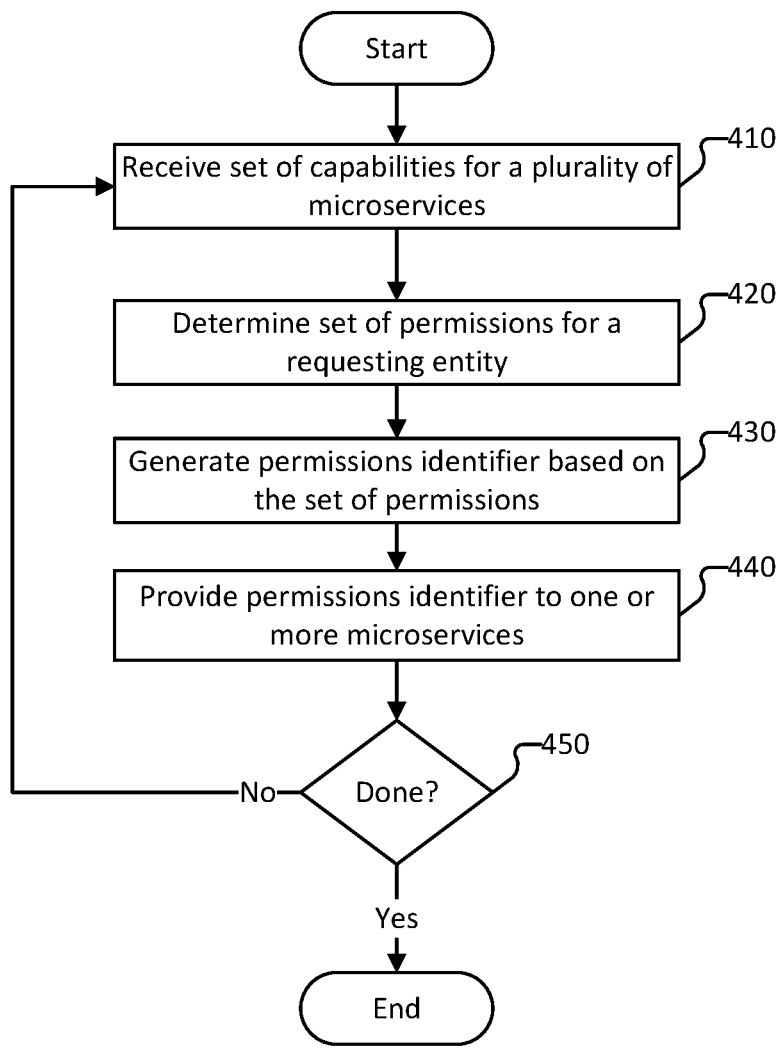
FIG. 4 is a flow diagram of a method for generating a permissions identifier according to various embodiments of the present application.

FIG. 4 is a flow diagram of a method for generating a permissions identifier according to various embodiments of the present application. In some embodiments, process 400 is implemented by system 100 of FIG. 1 and/or system 200 of FIG. 2. In some embodiments, process 400 is implemented by an identity provider such as identity provider 114 of system 100 of FIG. 1.

At 410, a set of capabilities for a plurality of microservices is received. In some embodiments, the system (e.g., the identity provider) obtains the set of capabilities for a microservice in a distributed computing environment either via a direct communication from the microservice or a broadcast issued by the microservice within the distributed computing environment. The microservice can communicate its corresponding set of supported capabilities in response to the microservice being newly deployed, in response to the microservice being updated (e.g., the set of supported capabilities being modified), and/or at periodic intervals such as at a predefined frequency.

At 420, a set of permissions for a requesting entity is determined. The system determines the permission for a requesting entity with respect to various capabilities (e.g., corresponding tasks) of one or more microservices. The system can determine the permissions based on a security policy or a set of predefined permissions (e.g., by an administrator). The security policy or set of predefined permissions can define permissions on a user-by-user basis, or based on a grouping of users such as based on a role, a job function, a department to which the user belongs, etc.

At 430, a permissions identifier is generated based on the set of permissions. In response to determining the permissions for the requesting entity, the system generates a permissions identifier based on the set of permissions. The permissions identifier indicates permissions that the requesting entity has with respect to various capabilities (e.g., the set of supported capabilities associated with a microservice or a set of microservices). In some embodiments, the permissions identifier comprises a bitstring or bitmap in which each bit field corresponds to a different capability or action associated with the capability.

At 440, a permissions identifier is provided to one or more microservices. The system communicates the permissions identifier to the applicable microservice(s). As an example, the system directly sends the permissions identifier to the applicable microservices. As another example, the system broadcasts the permissions identifier within the distributed computing environment, and the applicable microservices obtain the permissions identifier from such broadcast.

At 450, a determination is made as to whether process 400 is complete. In some embodiments, process 400 is determined to be complete in response to a determination that no further actions are to be performed, no further permissions identifiers are to be provided to microservices, a user has exited the system, an administrator indicates that process 400 is to be paused or stopped, etc. In response to a determination that process 400 is complete, process 400 ends. In response to a determination that process 400 is not complete, process 400 returns to 410.

Figure 5:
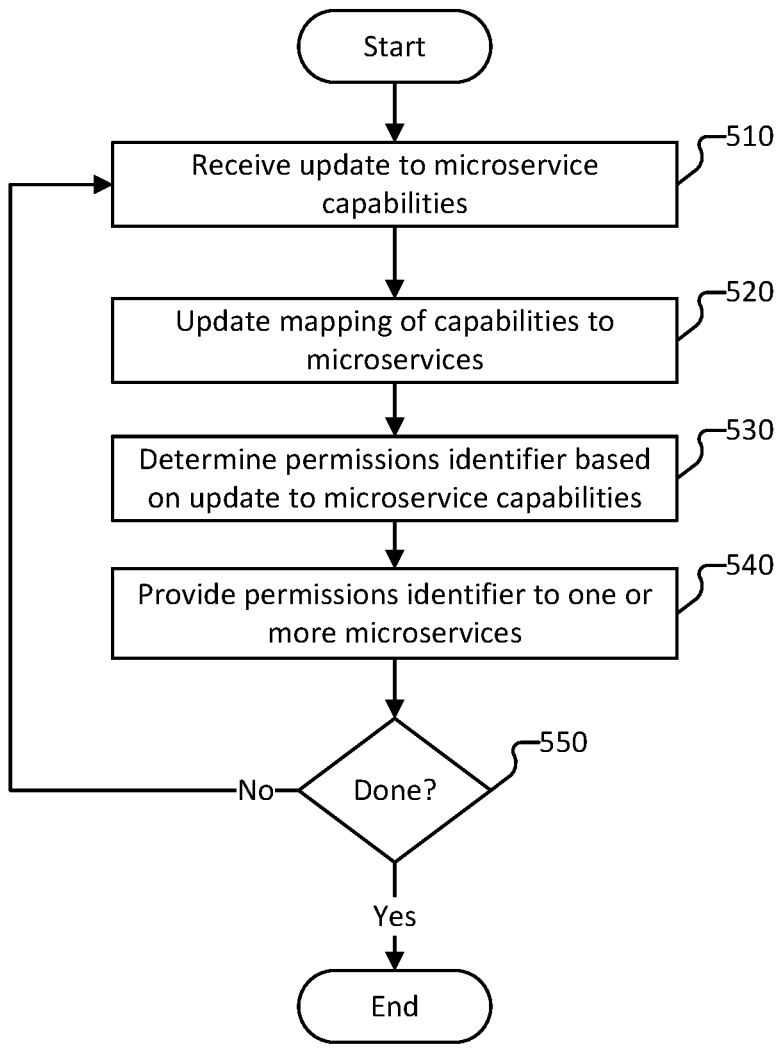
FIG. 5 is a flow diagram of a method for updating permissions identifiers based on an update to a set of capabilities supported by a microservice according to various embodiments of the present application.

FIG. 5 is a flow diagram of a method for updating permissions identifiers based on an update to a set of capabilities supported by a microservice according to various embodiments of the present application. In some embodiments, process 500 is implemented by system 100 of FIG. 1 and/or system 200 of FIG. 2. In some embodiments, process 500 is implemented by an identity provider such as identity provider 114 of system 100 of FIG. 1.

At 510, an update to microservice capabilities is received. In some embodiments, the system (e.g., the identity provider) obtains information pertaining to an update to a set of capabilities for a microservice in a distributed computing environment either via a direct communication from the microservice or a broadcast issued by the microservice within the distributed computing environment. In some embodiments, the information pertaining to the update to the set of capabilities includes an indication of a current set of supported capabilities for the microservice. In some embodiments, the information pertaining to the update to the set of capabilities includes an indication of changes to the set of supported capabilities for the microservice (e.g., an indication of newly supported/added capabilities, an indication of capabilities no longer supported, etc.).

At 520, a mapping of capabilities to microservices is updated. In response to receiving the update to the microservice capabilities, the system updates the information indicating a set of capabilities supported by the applicable microservice(s).

At 530, a permissions identifier is determined based on the update to the microservice capabilities. In some embodiments, in response to receiving the update to the microservice capabilities, the system generates an updated permissions identifier based on a current set of supported capabilities for a microservice(s). In some embodiments, the system periodically (e.g., at a predefined interval or frequency) determines whether to generate an updated permissions identifier (e.g., if the set of capabilities for a microservice has changed) and correspondingly generates the updated permission identifier using a currently stored set of capabilities for the microservice(s).

At 540, the permissions identifier is provided to one or more microservices. The system communicates the permissions identifier to the applicable microservice(s). As an example, the system directly sends the permissions identifier to the applicable microservices. As another example, the system broadcasts the permissions identifier within the distributed computing environment, and the applicable microservices obtain the permissions identifier from such broadcast.

At 550, a determination is made as to whether process 500 is complete. In some embodiments, process 500 is determined to be complete in response to a determination that no further actions are to be performed, no further permissions identifiers are to be provided to microservices, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
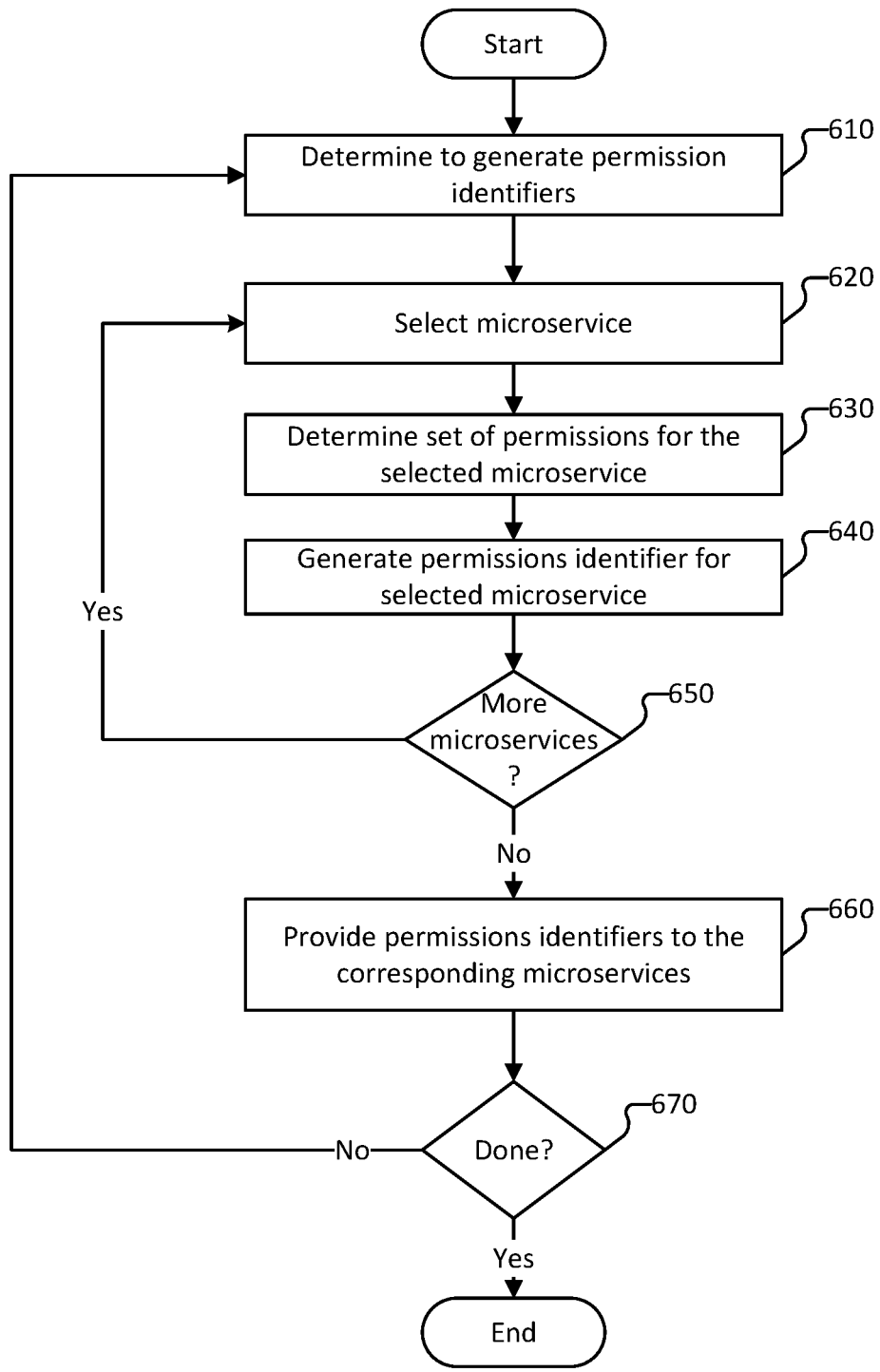
FIG. 6 is a flow diagram of a method for generating a plurality of permissions identifier for a plurality of microservices in a distributed computing environment according to various embodiments of the present application.

FIG. 6 is a flow diagram of a method for generating a plurality of permissions identifiers for a plurality of microservices in a distributed computing environment according to various embodiments of the present application. In some embodiments, process 600 is implemented by system 100 of FIG. 1 and/or system 200 of FIG. 2. In some embodiments, process 600 is implemented by an identity provider such as identity provider 114 of system 100 of FIG. 1.

At 610, a determination is made to generate permission identifiers. In some embodiments, the system (e.g., an identity provider) determines to generate permission identifiers in response to receiving an indication of a set of capabilities supported by one or more microservices, or an indication of an update to a set of capabilities supported by the one or more microservices. In some embodiments, the system determines to generate a permission identifier based on a predefined interval having lapsed since a last time the permission identifiers was generated and distributed to the applicable microservice(s).

At 620, a microservice is selected. The system selects a microservice from among a set of microservices within the distributed computing environment. The system can select the microservice that is to be associated with a permission identifier that is to be generated.

At 630, a set of permissions for the selected microservice is determined. The system determines a set of capabilities supported by the selected microservice and determines, for one or more requesting entities, a set of permissions for the selected microservice.

At 640, a permissions identifier is generated for the selected microservice. The system generates the permissions identifier for the selected microservice (or set of selected microservices) based at least in part on the set of permissions for the selected microservice. The permissions identifier corresponds to one or more requesting entities.

At 650, a determination is made as to whether additional microservices exist for which permissions identifiers are to be generated.

In response to determining that additional microservices exist at 650, process 600 returns to 620 and process iterates over 620-650 until no further microservices exist for which permissions identifiers are to be generated.

In response to determining that no additional microservices exist at 650, process 600 proceeds to 660 at which the permissions identifiers are provided to the corresponding microservice. The system communicates the permissions identifier to the applicable microservice(s). As an example, the system directly sends the permissions identifier to the applicable microservices. As another example, the system broadcasts (e.g., globally to all microservices within the distributed computing environment) the permissions identifier within the distributed computing environment, and the applicable microservices obtain the permissions identifier from such broadcast.

At 670, a determination is made as to whether process 600 is complete. In some embodiments, process 600 is determined to be complete in response to a determination that no further actions are to be performed, no further permissions identifiers are to be provided to microservices, a user has exited the system, an administrator indicates that process 600 is to be paused or stopped, etc. In response to a determination that process 600 is complete, process 600 ends. In response to a determination that process 600 is not complete, process 600 returns to 610.

Figure 7:
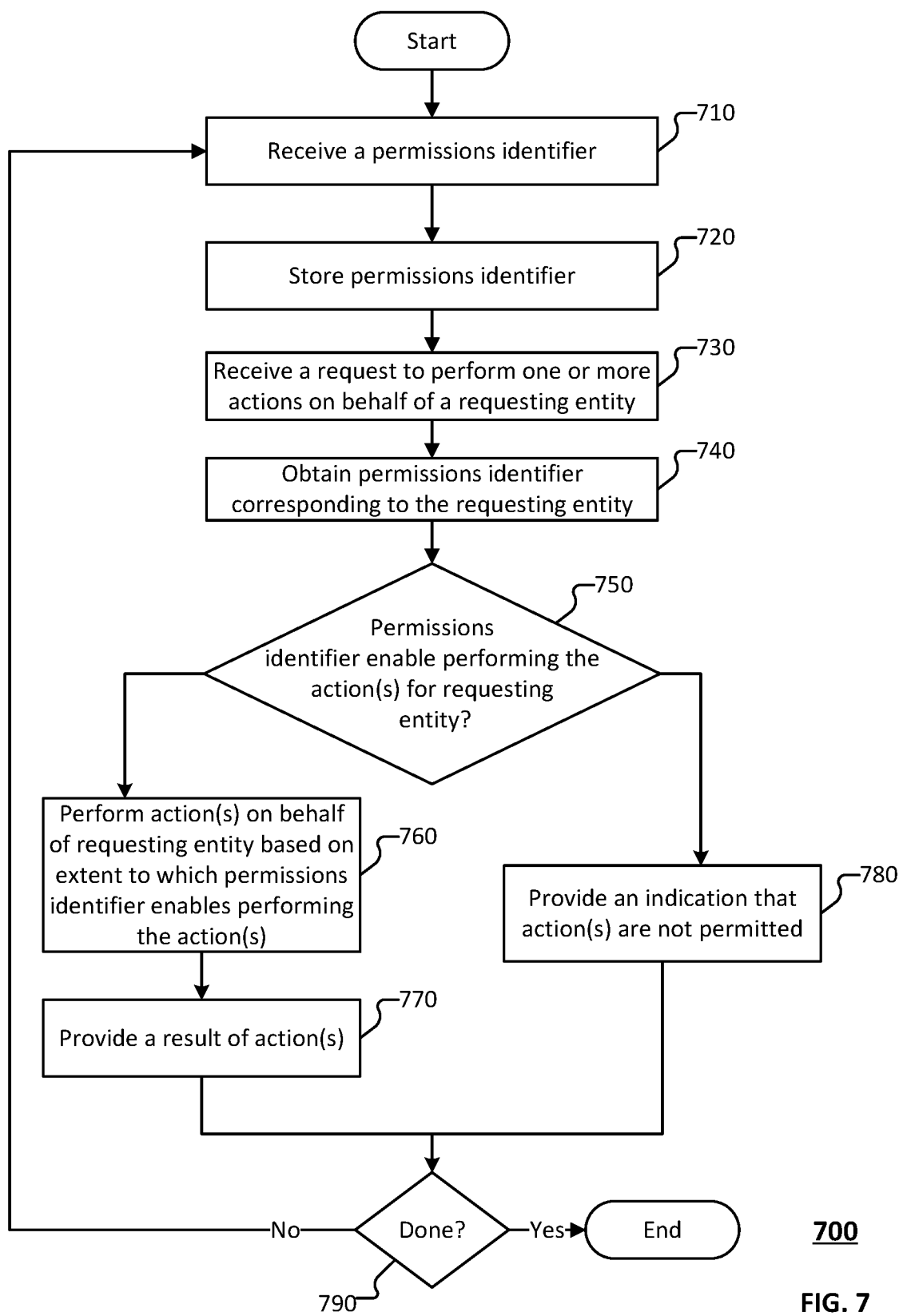
FIG. 7 is a flow diagram of a method for performing an action for a requesting entity according to various embodiments of the present application.

FIG. 7 is a flow diagram of a method for performing an action for a requesting entity according to various embodiments of the present application. In some embodiments, process 700 is implemented by system 100 of FIG. 1 and/or system 300 of FIG. 3. In some embodiments, process 700 is implemented by a microservice such as a microservice comprised in microservices 116 of system 100 of FIG. 1.

At 710, a permissions identifier is received. The system receives the permissions identifier from an identity provider. The permissions identifier may be received via a direct communication with the identity provider or based on a broadcast of the permissions identifier by the identity provider to various microservices within a distributed computing environment. In some embodiments, the permissions identifier is associated with one or more requesting entities and/or one or more microservices.

At 720, the permissions identifier is stored. In some embodiments, the microservice stores the permissions identifier in association with a particular requesting entity (e.g., a user). In some embodiments, the system stores the permissions identifier in a mapping of requesting entities to permission identifiers.

At 730, a request to perform one or more actions on behalf of a requesting entity is received. The system can receive the request to perform the one or more actions (e.g., tasks) directly from the requesting entity, or from a task router or other system/microservice requesting the system to perform the action on behalf of the requesting entity.

At 740, a permissions identifier corresponding to the requesting entity is obtained. In response to receiving the request to perform the one or more actions, the system determines the requesting entity on behalf of which the action is being requested and obtains the permissions identifier for the requesting entity. For example, the system queries a mapping of requesting entities to permission identifiers to obtain the permissions identifier for the requesting entity.

At 750, a determination is made as to whether the permissions identifier corresponding to the requesting entity enables the microservice to perform the action(s) on behalf of the requesting entity. The system determines, based on the permissions identifier, whether the requesting entity has requisite permissions for the action or to access/obtain the results of the action. For example, in the case of the permissions identifier being a bitstring or bitmap, the system determines the one or more bit fields corresponding to the requested action, determines a value in the one or more bit fields, and uses the value to determine whether the requesting entity has permission for the action.

In response to determining that the permissions identifier corresponding to the requesting entity enables the microservice to perform the action(s) on behalf of the requesting entity at 750, process 700 proceeds to 760 at which the action(s) is performed on behalf of the requesting entity based on an extent to which the permissions identifier enables the action(s) to be performed.

At 770, a result of performing the action(s) is provided. In some embodiments, the microservice provides the result of the action to the requesting entity, or another microservice that had invoked the microservice to perform the action.

In response to determining that the permissions identifier corresponding to the requesting entity does not enable the microservice to perform the action(s) on behalf of the requesting entity at 750, process 700 proceeds to 780 at which an indication that the action(s) is not permitted is provided.

At 790, a determination is made as to whether process 700 is complete. In some embodiments, process 700 is determined to be complete in response to a determination that no further actions are to be performed, a microservice has been disabled or stopped, a user has exited the system, an administrator indicates that process 700 is to be paused or stopped, etc. In response to a determination that process 700 is complete, process 700 ends. In response to a determination that process 700 is not complete, process 700 returns to 710.

Figure 8:
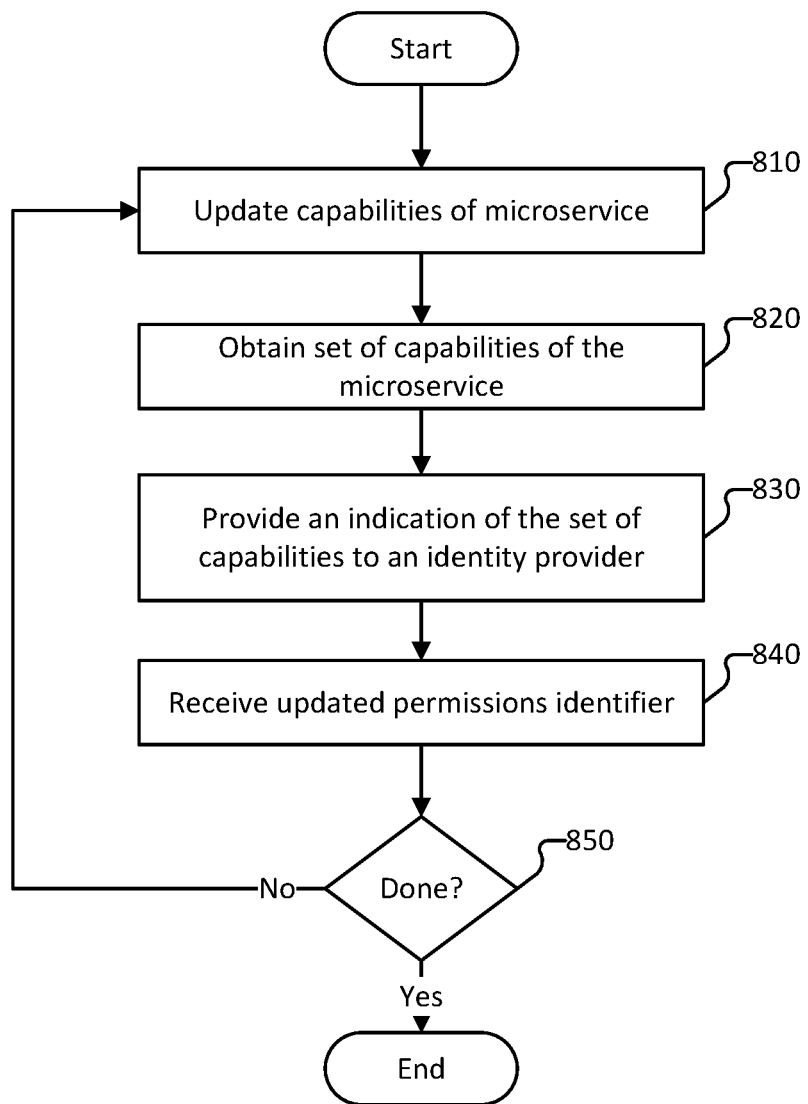
FIG. 8 is a flow diagram of a method for updating an identity provider with an updated set of capabilities supported by a microservice according to various embodiments of the present application.

FIG. 8 is a flow diagram of a method for updating an identity provider with an updated set of capabilities supported by a microservice according to various embodiments of the present application. In some embodiments, process 800 is implemented by system 100 of FIG. 1 and/or system 300 of FIG. 3. In some embodiments, process 800 is implemented by a microservice such as a microservice comprised in microservices 116 of system 100 of FIG. 1.

At 810, capabilities of a microservice are updated. In some embodiments, the capabilities of the microservice are updated based on a configuration from an administrator or other developer of the microservice. The update to the capabilities can include addition of a new capability or deletion of an existing capability, etc.

At 820, a set of capabilities supported by a microservice are obtained. In response to determining that the capabilities supported by a microservice are updated, the system (e.g., the microservice) obtains an indication of the set of capabilities currently supported by the microservice (e.g., the updated set of capabilities).

At 830, an indication of the set of capabilities supported by a microservice is provided to an identity provider. In some embodiments, the microservice broadcasts the indication of the set of capabilities supported by such microservice.

At 840, an updated permissions identifier is received. In some embodiments, the microservice receives an updated permissions identifier from the identity provider. The identity provider can generate the updated permissions identifier in response to receiving (e.g., from the microservice) an indication of the updated set of capabilities supported by the microservice.

At 850, a determination is made as to whether process 800 is complete. In some embodiments, process 800 is determined to be complete in response to a determination that no further actions are to be performed, a microservice has been disabled or stopped, a user has exited the system, an administrator indicates that process 800 is to be paused or stopped, etc. In response to a determination that process 800 is complete, process 800 ends. In response to a determination that process 800 is not complete, process 800 returns to 810.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory;
one or more processors configured to:
receive, by a microservice comprised in a distributed computing environment, a permissions identifier comprising an indication of the set of permissions permitted for a requesting entity;
receive, by the microservice, a request to perform one or more actions on behalf of the requesting entity;
determine whether the permissions identifier enables performing the one or more actions on behalf of the requesting entity; and
in response to determining that the permissions identifier enables performing the one or more actions on behalf of the requesting entity,
perform the one or more actions; and
provide to the requesting entity one or more results for the one or more actions; and
determine, by the microservice, that a set of capabilities supported by the microservice are updated; and
communicate, to an identity provider, an update to the set of capabilities supported by the microservice.

2. The system of claim 1, wherein the microservice communicates to an identity provider an indication of a set of capabilities supported by the microservice.

3. The system of claim 1, wherein the microservice broadcasts the indication of the set of capabilities supported by the microservice.

4. The system of claim 1, wherein the one or more processors are further configured to:
receive an updated permissions identifier corresponding to the updated set of capabilities supported by the microservice.

5. The system of claim 1, wherein the set of capabilities for a particular microservice includes a set of microservice actions that the microservice is configured to perform.

6. The system of claim 1, wherein the set of capabilities of the plurality of microservices are obtained based on information respectively broadcast by the plurality of microservices.

7. The system of claim 1, wherein the identity provider stores a mapping of capabilities to microservices.

8. The system of claim 1, wherein the requesting entity is a user.

9. The system of claim 8, wherein the set of permissions comprises a set of permitted actions the user is permitted to take.

10. The system of claim 9, wherein the set of permitted actions comprise only actions corresponding to capabilities of an assigned set of microservices that is assigned to perform the set of one or more actions.

11. The system of claim 1, wherein generating a permissions identifier comprising an indication of the set of permissions permitted for the requesting entity comprises:
generating, for each of a plurality of microservices, a particular permissions identifier that includes an indication of permissions corresponding to a current set of capabilities for the corresponding microservice.

12. The system of claim 1, wherein the identity provider generates a plurality of permissions identifier for a plurality of users associated with the distributed computing environment.

13. The system of claim 1, wherein the permissions identifier indicates whether the requesting entity has permission to access a particular set of information.

14. The system of claim 1, wherein the permissions identifier is a string.

15. The system of claim 1, wherein the permissions identifier is a bitstring g, and a bit in the bitstring corresponds to a particular permission of the set of permissions permitted for the requesting entity.

16. The system of claim 15, wherein the permissions identifier is configured according to a predefined bitstring protocol associated with the one or more microservices.

17. The system of claim 16, wherein the predefined bitstring protocol is associated with the requesting entity.

18. The system of claim 17, wherein the bitstring comprises indications of the set of permissions for all microservices in the distributed computing environment.

19. A method, comprising:
receiving, by a microservice comprised in a distributed computing environment, a permissions identifier comprising an indication of the set of permissions permitted for a requesting entity;
receiving, by the microservice, a request to perform one or more actions on behalf of the requesting entity;
determining whether the permissions identifier enables performing the one or more actions on behalf of the requesting entity; and
in response to determining that the permissions identifier enables performing the one or more actions on behalf of the requesting entity,
performing the one or more actions; and
providing to the requesting entity one or more results for the one or more actions; and determining, by the microservice, that a set of capabilities supported by the microservice are updated; and communicating, to an identity provider, an update to the set of capabilities supported by the microservice.

20. A computer program product embodied in a non-transitory computer readable medium and comprising computer instructions for:

receiving, by a microservice comprised in a distributed computing environment, a permissions identifier comprising an indication of the set of permissions permitted for a requesting entity;

receiving, by the microservice, a request to perform one or more actions on behalf of the requesting entity;

determining whether the permissions identifier enables performing the one or more actions on behalf of the requesting entity; and in response to determining that the permissions identifier enables performing the one or more actions on behalf of the requesting entity,
- performing the one or more actions; and
- providing to the requesting entity one or more results for the one or more actions; and determining, by the microservice, that a set of capabilities supported by the microservice are updated; and communicating, to an identity provider, an update to the set of capabilities supported by the microservice.

\* \* \* \* \*